Patented May 11, 1948

2,441,529

UNITED STATES PATENT OFFICE 2,441,529

CARBOCYANINE DYES CONTAINING A MESOCYCLOALKYL GROUP

Leslie G. S. Brooker and Grafton H. Keyes, Rochester, N. Y., assignors to Eastman Kodak Company, Rochester, N. Y., a corporation of New Jersey No Drawing. Application December 28, 1943, Serial No. 515,978

10 Claims. (Cl. 260—240)

This invention relates to carbocyanine dyes containing a mesocycloalkyl group and to a process for the preparation thereof, as well as to photographic emulsions sensitized with such dyes.

Carbocyanine dyes containing mesoalkyl groups are known and some of these dyes are strong sensitizers of photographic silver halide emulsions. We have now succeeded in obtaining carbocyanine dyes containing a mesocycloalkyl group and have found that certain of these new dyes (those containing a mesocyclopropyl group) are stronger sensitizers of photographic emulsions than the known straight chain mesoalkyl dyes of equal carbon content.

It is, accordingly, an object of our invention to provide mesocycloalkyl dyes and a process for the preparation thereof. A further object is to provide photographic emulsions sensitized with such dyes. Other objects will become apparent hereinafter.

In accordance with our invention, we provide carbocyanine dyes containing a mesocycloalkyl group (i. e., a cycloalkyl group at the central carbon atom of the trimethine chain) by condensing a cyclammonium quaternary salt containing a methyl group in the α- or γ-position (i. e., one of the so-called reactive positions) with a cyclammonium quaternary salt containing in a reactive position (i. e., the α- or γ-position) a β-cycloalkyl-β-mercaptoalkylvinyl group. Exemplary of the cyclammonium quaternary salts containing a methyl group in a reactive position are those of the oxazole series (e. g. 2-methylbenzoxazole alkyl quaternary salts and 2-methyl-α- and β-naphthoxazole alkyl quaternary salts), those of the thiazole series (e. g., those of the benzothiazole series, such as 5-chloro-2-methylbenzothiazole alkyl quaternary salts and those of the naphthothiazole series, such as 2-methyl-α- and β-naphthothiazole alkyl quaternary salts) and those of the selenazole series, such as 2-methylbenzoselenazole alkyl quaternary salts for example. Exemplary of the cyclammonium quaternary salts containing a β-cycloalkyl-β-mercaptoalkylvinyl group in a reactive position are those of the thiazole series (e. g., 2-(β-cycloalkyl-β-mercaptoalkyl)-benzothiazole alkyl quaternary salts and 2-(β-cycloalkyl-β-mercaptoalkylvinyl)-β-naphthothiazole alkyl quaternary salts, and those of the selenazole series (e. g., 2-(β-cycloalkyl-β-mercaptoalkylvinyl)-benzoselenazole alkyl quaternary salts). These mercaptoalkylvinyl derivatives are prepared by adding an alkyl salt to a thioketone derivative of a heterocyclic nitrogen base.

The condensations are advantageously carried out in the presence of a basic condensing agent. Exemplary of the basic condensing agents are tertiary amines, especially trialkyl amines, such as trimethyl and triethylamine, or N-methylpiperidine. Heat accelerates the condensations.

Those of our new dyes which can be represented by the following general formula are especially useful as sensitizers of photographic emulsions:

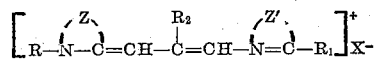

wherein R and $R_1$ represent alkyl groups of the formula $C_nH_{2n+1}$, especially wherein $n$ represents a positive integer of from one to four, $R_2$ represents a cycloalkyl group of the formula $C_nH_{2n-1}$ wherein $n$ represents a positive integer of from 3 to 6, Z and Z' each represents the non-metallic atoms necessary to complete a heterocyclic nucleus selected from the group consisting of those of the benzothiazole series, those of the α-naphthothiazole series, those of the β-naphthothiazole series, and those of the benzoselenazole series, and X represents an anion. The cyclopropyl dyes are generally the best photographic sensitizers.

The following examples will serve to illustrate our new dyes and the manner of obtaining them.

*Example 1.—9-cyclopropyl-3,3'-diethylthiacarbocyanine iodide*

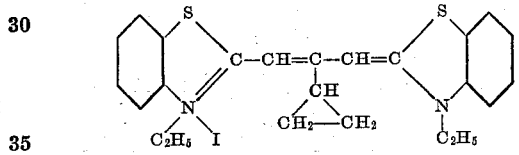

1.3 g. (1 mol.) of 2-cyclopropylthioformylmethylene-3-ethylbenzothiazoline and 1 g. (1 mol.) methyl-p-toluenesulfonate were heated together on a steam bath for 30 minutes. The resulting mercapto intermediate was dissolved in 15 cc. of absolute ethyl alcohol, 1.5 g. (1 mol.) 2-methylbenzothiazole ethiodide and 1 g. (2 mol.) of triethylamine were added and the mixture heated under reflux for 15 minutes. Dye separated on chilling. It was purified by twice recrystallizing from methyl alcohol and obtained as green crystals. Melting point 202–204° C. dec.

*Example 2.—9-cyclopropyl-3,3'-dimethylthiacarbocyanine bromide*

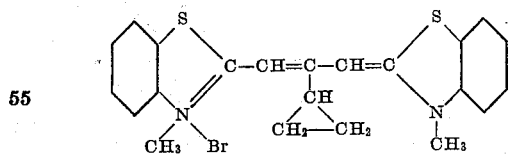

1.25 g. (1 mol.) of 2-cyclopropylthioformylmethylene-3-methylbenzothiazoline and 1 g. (1 mol.) methyl p-toluenesulfonate were heated on a steam bath for 30 minutes. The mercapto intermediate thus formed was dissolved in 20 cc. of absolute ethyl alcohol and 1.7 g. (1 mol.) 2-methylbenzothiazole metho-p-toluenesulfonate, 1 g. (2 mol.) triethylamine were added and the mixture refluxed for 15 minutes. Dye separated on addition of excess KBr and chilling. It was collected on filter, washed with water, acetone and dried. It was purified by recrystallization from methyl alcohol and obtained as brown needles. Melting point 189–191° C. dec.

*Example 3.—9-cyclopropyl-3,3'-diethyl-4,5,4',5'-dibenzothiacarbocyanine bromide*

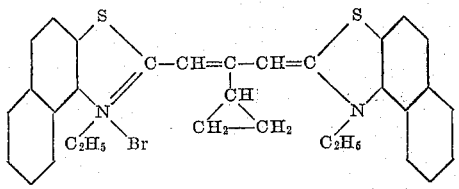

1.5 g. (1 mol.) of 2-cyclopropylthioformylmethylene-1-ethyl-β-naphthothiazoline and 1 g. (1 mol.) methyl-p-toluene-sulfonate were heated together on a steam bath for 30 minutes. The mercapto intermediate thus formed was dissolved in 20 cc. of absolute ethyl alcohol, 2 g. (1 mol.) 2-methyl-β-naphthothiazole etho-p-toluenesulfonate and 1 g. (2 mol.) triethylamine were added and the mixture refluxed for 15 minutes. Dye was precipitated on addition of excess KBr. It was collected on filter, washed with water, acetone and dried. It was purified by repeated recrystallizations from methyl alcohol and obtained as dark green crystals. Melting point 220–222° C. dec.

*Example 4.—5,5'-dichloro-9-cyclopropyl-3,3'-diethylthiacarbocyanine iodide*

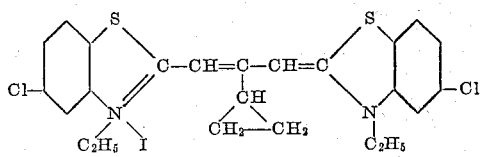

1.5 g. (1 mol.) of 5-chloro-2-cyclopropyl thioformylmethylene-3-ethylbenzothiazoline and 1 g. (1 mol.) methyl-p-toluenesulfonate were heated together in an oil bath at 130° C. for 30 minutes. The mercapto intermediate thus formed was dissolved in 20 cc. of absolute ethyl alcohol, 1.9 g. (1 mol.) 5-chloro-2-methylbenzothiazole etho-p-toluenesulfonate and 1 g. (2 mol.) triethylamine were added and the mixture refluxed for 15 minutes. Dye separated from the cooled reaction mixture on addition of ether. It was converted to iodide by addition of excess KI to an alcoholic solution. The crude well washed dye was purified by repeated recrystallizations from methyl alcohol and obtained as minute greenish crystals. Melting point 212–214° C. dec.

*Example 5.—5'-chloro-9-cyclopropyl-3,3'-diethyl-4,5-benzothiacarbocyanine iodide*

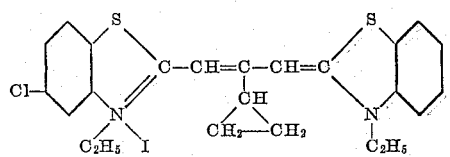

1.5 g. (1 mol.) of 5-chloro-2-cyclopropyl thioformylmethylene-3-ethylbenzothiazoline and 1 g. (1 mol.) of methyl-p-toluenesulfonate were heated together in an oil bath at 120–130° C. for 30 minutes. The mercapto intermediate thus formed was dissolved in 20 cc. of absolute ethyl alcohol, 2 g. (1 mol.) of 2-methyl-β-naphthothiazole etho-p-toluenesulfonate and 1 g. (2 mol.) of triethylamine were added and the mixture refluxed for 15 minutes. Dye separated on addition of excess aqueous KI. The crude well washed dye was further purified by repeated recrystallizations from methyl alcohol and was obtained as green crystals. Melting point 176–178° C. dec.

*Example 6.—9-cyclopropyl-3,3'-dimethyl-4,5,4',5'-dibenzothiacarbocyanine iodide*

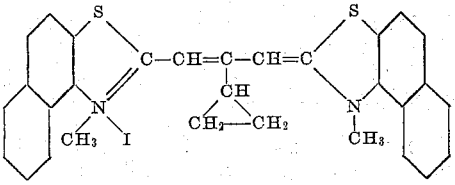

1.5 g. (1 mol.) of 2-cyclopropylthioformylmethylene-1-methyl-β-naphthothiazoline and 1 g. (1 mol.) of methyl-p-toluenesulfonate were heated together on a steam bath for 30 minutes. The mercapto intermediate thus formed was dissolved in 30 cc. of absolute ethyl alcohol, 1.9 g. (1 mol.) 2-methyl-β-naphthothiazole metho-p-toluenesulfonate and 1 g. (2 mol.) triethylamine were added and the mixture refluxed for 15 minutes. Dye separated on adding excess of aqueous KI and chilling after collecting on filter and washing well with water it was purified by repeated recrystallizations from methyl alcohol. It was obtained as brown crystals. Melting point 227–229° C. dec.

*Example 7.—9-cyclopropyl-3,3'-diethylselenacarbocyanine iodide*

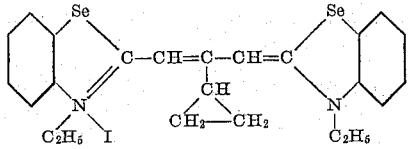

1.5 g. (1 mol.) of 2-cyclopropylthioformylmethylene-3-ethylbenzoselenazoline and 1 g. (1 mol.) methyl-p-toluenesulfonate were heated together on a steam bath for 1 hour. The mercapto intermediate thus formed was dissolved in 25 cc. of absolute ethyl alcohol, 1.7 g. (1 mol.) 2-methylbenzoselenazole ethiodide and 1 g. (2 mol.) triethylamine were added and the mixture refluxed for 15 minutes. Dye separated when the cooled reaction mixture was treated with 100 cc. of ether. The crude dye was washed with water, acetone and then repeatedly recrystallized from methyl alcohol. It was obtained as dark brown crystals. Melting point 178–180° C. dec.

*Example 8.—9-cyclobutyl-3,3'-diethylthiacarbocyanine iodide*

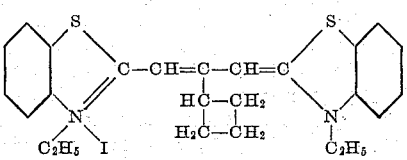

1.4 g. (1 mol.) of 2-cyclobutylthioformylmethylene-3-ethylbenzothiazoline and 1 g. (1 mol.) methyl-p-toluenesulfonate were heated together on a steam bath for 30 minutes. The mercapto intermediate thus formed was dissolved in 20 cc. of absolute ethyl alcohol, 1.5 g. 2-methylbenzothiazole ethiodide and 1 g. (2 mol.) triethylamine were added and the mixture refluxed for 15 minutes. Dye separated on chilling and was collected on filter, washed with water, acetone and dried. It was purified by repeated recrystallizations from methyl alcohol. It was obtained as garnet prisms. Melting point 235–238° C. dec.

*Example 9.—9-cyclohexyl-3,3'-diethylthiacarbocyanine iodide*

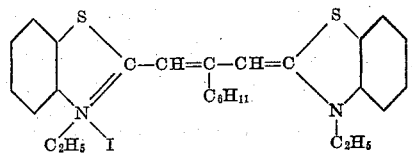

1.5 g. (1 mol.) of 2-cyclohexylthioformylmethylene-3-ethyl benzothiazoline and 1 g. (1 mol.) methyl-p-toluenesulfonate were heated together on a steam bath for 30 minutes. The resulting mercapto intermediate was dissolved in 20 cc. of absolute ethyl alcohol. 1.5 g. (1 mol.) 2-methylbenzothiazole ethiodide and .5 g. (1 mol.) of triethylamine were added and the mixture heated under reflux for 15 minutes. Dye separated on chilling. It was purified by two recrystallizations from methyl alcohol and obtained as garnet crystals with a green reflex. Melting point 205–207° C.

*Example 10.—5,5'-dichloro-9-cyclohexyl-3,3'-diethylthiacarbocyanine-p-toluenesulfonate*

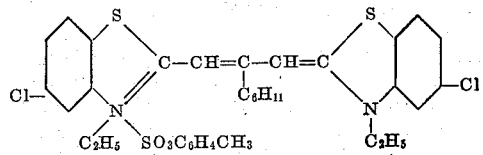

1.7 g. (1 mol.) 5-chloro-2-cyclohexylthioformylmethylene-3-ethylbenzothiazoline and 1 g. (1 mol.) methyl-p-toluenesulfonate were heated together on a steam bath for 30 minutes. The resulting mercapto intermediate which formed was dissolved in 20 cc. of absolute ethyl alcohol and 1.9 g. (1 mol.) 5-chloro - 2 - methylbenzothiazole etho-p-toluenesulfonate, 5 g. (1 mol.) triethylamine were added and the mixture refluxed for 15 minutes. The dye separated on chilling and was collected on a filter, washed with water, acetone and dried. It was purified by two recrystallizations from methyl alcohol. Melting point 222–225° C. dec.

*Example 11.—9-cyclohexyl-3,3'-diethyl-4,5,4',5'-dibenzothiacarbocyanine iodide*

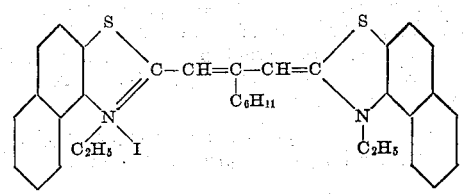

1.75 g. (1 mol.) 2-cyclohexylthioformylmethylene-1-ethyl-β-naphthothiazoline and 1 g. (1 mol.) methyl-p-toluenesulfonate were heated together on a steam bath for two hours. The mercapto intermediate thus obtained was dissolved in 25 cc. of absolute ethyl alcohol. 2 g. (1 mol.) 2-methyl-β-naphthothiazole etho-p-toluene sulfonate and 1 g. (2 mol.) triethylamine were added and the mixture refluxed for 15 minutes. Excess of sodium iodide was added and the mixture chilled. Dye separated and was collected on a filter, washed with water, acetone and dried. It was purified by recrystallization from methyl alcohol and obtained as dull greenish crystals. Melting point 227–229° C. dec.

*Example 12.—9-cyclohexyl-3,3'-diethylselenacarbocyanine iodide*

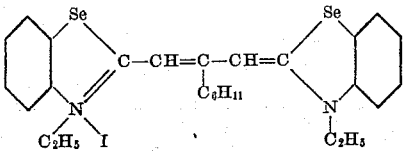

.9 g. (1 mol.) of 2-cyclohexylthioformylmethylene-3-ethylbenzoselenazoline and .5 g. (1 mol.) methyl-p-toluenesulfonate were heated together on a steam bath for 30 minutes. The mercapto intermediate thus formed was dissolved in 20 cc. of absolute ethyl alcohol. .9 g. (1 mol.) 2-methylbenzoselenazole ethiodide and .5 g. (2 mols.) of triethylamine were added and the mixture refluxed 15 minutes. Dye separated on chilling. It was purified by recrystallization from methyl alcohol and obtained as green crystals. Melting point 205–206° C. dec.

*Example 13.—5,5'-dichloro-9-cyclobutyl-3,3'-diethylthiacarbocyanine iodide*

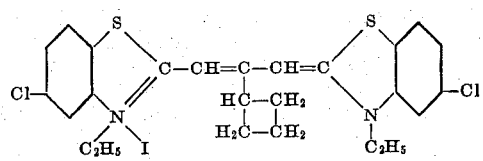

1.5 g. (1 mol.) of 5-chloro-2-cyclobutylthioformylmethylene-3-ethylbenzothiazoline and 1 g. (1 mol.) methyl-p-toluenesulfonate were heated together on a steam bath for 30 minutes. The mercapto intermediate thus formed was dissolved in 20 cc. of absolute ethyl alcohol. To this was added 1.7 g. (1 mol.) 5-chloro-2-methyl benzothiazole ethiodide, 1 g. (2 mols.) triethylamine and the mixture refluxed for 15 minutes. Dye separated on chilling and was collected on a filter, washed with water, acetone and dried. It was purified by recrystallization from methyl alcohol and obtained as green crystals. Melting point 244–247° C.

As illustrated in the foregoing examples, the cyclammonium quaternary salts containing a β-cycloalkyl-β-mercaptoalkylvinyl group in a reactive position can be prepared by adding an alkyl salt to a thioketone derivative of a heterocyclic nitrogen base. The thioketone derivatives can be prepared by treating a cyclammonium quaternary salt containing a β-cycloalkyl-β-halogenovinyl in a reactive position with a thioamide (according to the process described in our copending application, Serial No. 356,656, filed September 30, 1940, now U. S. Patent 2,369,657, dated February 20, 1945). The β-cycloalkyl-β-halogenovinyl derivatives can be prepared by treating a ketone derivative of a heterocyclic nitrogen base with a phosphorous oxyhalide (according to the process described in United States Patent 2,231,659, dated February 11, 1941). The ketone derivative can be prepared by condensing a cyclammonium quaternary salt containing a methyl group in a reactive position with an acyl halide, in the presence of an acid-binding agent (according to the process of United States Patent 2,112,139, dated March 22, 1938). The following examples will serve to illustrate the preparation of the thioketone derivatives and intermediates required therefor.

*Example 14.—2-cyclopropylthioformylmethylene-3-ethylbenzothiazoline*

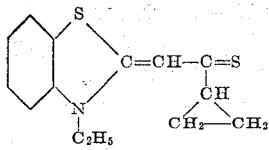

15.3 g. (1 mol.) of 2-cyclopropylformylmethylene-3-ethylbenzothiazoline was dissolved in 50 cc. of dry benzene. 14.2 g. (1.5 mol.) of phosphorous oxychloride was added and the mixture well stirred. After a few minutes the 2-(β-chloro-β-cyclopropylvinyl) benzothiazole etho chloride which had formed was precipitated on addition of 100 cc. of ether. This was collected on a filter and added to a solution of 4.7 g. (1 mol.) of thioacetamide in 25 cc. of ethyl alcohol. The mixture was heated under reflux for 5 minutes. The thioketone separated on chilling and was collected on filter, washed with water and dried. It was purified by two successive recrystallizations from methyl alcohol and obtained as yellow crystals. Melting point 123°–125° C.

The 2-cyclopropylformylmethylene-3-ethylbenzothiazoline employed above was prepared as follows:

30 g. (1 mol.) of 2-methylbenzothiazole etho-p-toluenesulfonate was suspended in 50 cc. of pyridine and the mixture chilled by means of a freezing mixture of ice and acetone. 9.1 g. (1 mol.) of cyclopropane carboxylic acid chloride was added slowly with good stirring. This mixture was allowed to stand in the cold for about 15 minutes. It was then removed from the freezing mixture and allowed to come slowly to room temperature and finally was heated to the temperature of a steam bath. The ketone separated as a sticky mass when the pyridine solution was poured into 500 cc. of cold water. After collecting on a filter, it was purified by recrystallizing from ligroin.

In a similar manner, 2-cyclopropylthioformylmethylene-3-methylbenzothiazoline was prepared as yellow-orange needles melting at 171°–172° C. dec. Similarly 5-chloro-2-cyclopropylthioformylmethylene-3-ethylbenzothiazoline was prepared as opaque yellow crystals melting at 189° to 191° C.

*Example 15.—2-Cyclopropylthioformylmethylene-1-ethyl-β-naphthothiazoline*

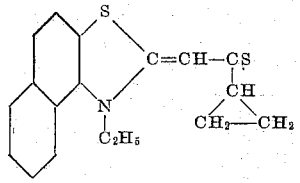

10.4 g. (1 mol.) of 2-cyclopropylformylmethylene-1-ethyl-β-naphthothiazoline was suspended in 35 cc. of dry benzene. 8.1 g. (1.5 mol.) of phosphorus oxychloride was added and the mixture stirred at room temperature for about 10 minutes. The 2-(β-chloro-β-cyclopropylvinyl)-β-naphthothiazole ethochloride formed by the above reaction separated on chilling and was collected on a filter and washed with ether. It was added to a solution of 2.6 g. (1 mol.) thioacetamide in 35 cc. of absolute ethyl alcohol and the mixture refluxed for 5 minutes. Thioketone separated on chilling and was collected on filter, washed with water and dried. It was purified by repeated recrystallization from methyl alcohol and obtained as amber flakes. Melting point 179°–181° C. dec.

The 2-cyclopropylformylmethylene-1-ethyl-β-naphthothiazoline employed above was prepared as follows:

39.9 g. (1 mol.) of 2-methyl-β-naphthothiazole etho-p-toluenesulfonate was dissolved in 50 cc. of pyridine and chilled in freezing mixture of ice-acetone. 10.4 g. (1 mol.) cyclopropane carboxylic acid chloride was added slowly with good stirring. The mixture was allowed to stand 5 minutes in the cold, then allowed to come to room temperature and finally heated to the temperature of a steam bath. The ketone separated as a sticky mass when poured into a large volume of cold water. It was purified by recrystallization from ligroin.

In a similar manner 2-cyclopropylthioformylmethylene-1-methyl-β-naphthothiazoline was prepared as yellow crystals melting at 175° to 177° C. dec.

*Example 16.—2-Cyclopropylthioformylmethylene-3-ethylbenzoselenazoline*

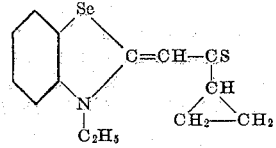

17 g. of 2-cyclopropylformylmethylene-3-ethylbenzoselenazoline was suspended in 100 cc. of dry benzene. 13.4 g. (1.5 mol.) of phosphorus oxychloride was added with stirring. After about 10 minutes the chlorointermediate separated and was collected on filter and washed with ether. It was then added to a solution of 4.4 g. (1 mol.) thioacetamide dissolved in 50 cc. of absolute ethyl alcohol and the mixture refluxed for 5 minutes. The thioketone separated on chilling. It was collected on filter, washed with water and recrystallized from methyl alcohol. It was obtained as yellow crystals. Melting point 111°–113° C.

The 2-cyclopropylformylmethylene-3-ethylbenzoselenazoline employed was prepared as follows:

34.2 g. (1 mol.) of 2-methylbenzoselenazole ethiodide was suspended in 75 cc. of pyridine and the mixture chilled in a freezing mixture of ice-acetone. 10.4 g. (1 mol.) cyclopropanecarboxylic acid chloride was added slowly with good stirring. The mixture was stirred in the cold for a 15-minute period. It was removed from the freezing mixture and heated gradually to temperature of the steam bath. On pouring into a large volume of cold water, the ketone separated. It was collected on filter and washed with water. It was further purified by recrystallization from ligroin.

*Example 17.—5-chloro-2-cyclopropylthioformylmethylene-3-ethylbenzothiazoline*

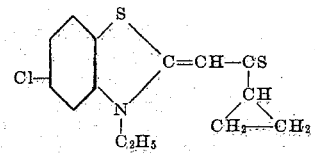

16.7 g. (1 mol.) of 5-chloro-2-cyclopropylformylmethylene-3-ethylbenzothiazoline was dissolved in 50 cc. of dry benzene. 13.8 g. (1 mol.) of phosphorus oxychloride was added with stirring. After about 10 minutes the 2-(β-chloro-β-cyclopropylvinyl)-5-chlorobenzothiazole etho chloride which had formed separated and was collected on filter and washed with ether. This was added to a solution of 4.5 g. (1 mol.) of thioacetamide in 30 cc. of absolute ethyl alcohol and the mixture refluxed for 5 minutes. Thioketone separated on chilling and was collected on filter, washed with water and dried. It was purified by repeated recrystallizations from methyl alcohol and obtained as opaque yellow crystals. Melting point 189°–191° C. dec.

The 5-chloro-2-cyclopropylformylmethylene-3-ethylbenzothiazoline employed above was prepared as follows:

38.3 g. (1 mol.) of 5-chloro-2-methylbenzothiazole etho-p-toluene sulfonate was suspended in 50 cc. of pyridine and chilled in a freezing mixture of ice-water. 10.4 g. (1 mol.) of cyclopropane carboxylic acid chloride was added slowly with good stirring. The mixture was allowed to stand 15 minutes in the cold, then allowed to come to room temperature and finally heated a few minutes on a steam bath. Ketone separated on pouring into a large volume of cold water. It was collected on a filter, washed with water and dried. It was further purified by recrystallization from ligroin.

In a similar manner, 5-chloro-2-cyclobutylthioformylmethylene-3-ethyl benzothiazoline was prepared as yellow crystals melting at 150°–152° C.

*Example 18.—2-cyclohexylthioformylmethylene-3-ethylbenzothiazoline*

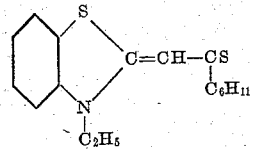

45 g. (1 mol.) of 2-cyclohexylformylmethylene-3-ethylbenzothiazoline was suspended in 100 cc. of dry benzene. 36 g. (1.5 mol.) of phosphorus oxychloride was added and the mixture well stirred. After a few minutes the 2-(β-chloro-β-cyclohexylvinyl) benzothiazole ethochloride which had formed was precipitated on addition of 200 cc. of ether. This product was collected on a filter and washed with acetone. It was then added to a solution of 11.7 g. (1 mol.) of thioacetamide in 100 cc. of ethyl alcohol. This mixture was heated under reflux for five minutes. The thioketone separated on chilling and was collected on filter, washed with water and purified by recrystallization from methyl alcohol. Melting point 146°–148° C.

The 2-cyclohexylformylmethylene-3-ethylbenzothiazoline used above was prepared as follows:

69.8 g. (1 mol.) of 2-methylbenzothiazole etho-p-toluenesulfonate was suspended in 200 cc. of pyridine and the mixture chilled by means of a freezing mixture of ice and acetone. 36.4 g. (1.25 mol.) of hexahydrobenzoyl chloride was added slowly with good mechanical stirring. This mixture was allowed to stand in the cold for a 15-minute period. It was then removed from the freezing mixture and stood at room temperature for 15 minutes; then after heating to temperature of a steam bath, as much as possible of the pyridine was removed by distillation under reduced pressure. The residue was poured out into ice and water. The product separated as a crystalline solid and was collected on a filter and washed with water. After recrystallization from methyl alcohol, it was pure enough for use.

In a similar manner 5-chloro-2-cyclohexylthioformylmethylene-3-ethylbenzothiazoline was prepared as orange crystals melting at 151°–153° C. Also in a similar manner, 2-cyclohexylthioformylmethylene-1-ethyl-β-naphthothiazoline was prepared as yellow crystals melting at 191°–193° C. Likewise, in a similar manner, 2-cyclohexylthioformylmethylene - 3 - ethylbenzoselenazoline was prepared as orange-yellow crystals melting at 147°–149° C.

We have also succeeded in obtaining merocarbocyanine dyes containing a cycloalklyl group on the dimethine chain. We have obtained such dyes by condensing a cycloammonium quaternary salt containing a β-cycloalkyl-β-mercaptoalkyl vinyl group in a reactive position, with a heterocyclic compound containing in the heterocyclic ring a ketomethylene group, i. e., a group of the following formula:

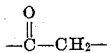

The condensations are advantageously carried out in the presence of a basic condensing agent. Alcoholic solutions of tertiary amines, such as triethylamine, N-methyl piperidine or pyridine can be employed as basic condensing agents. Heat accelerates the condensations.

The following examples will serve to illustrate the preparation of our new merocarbocyanine dyes:

*Example 19.—3 - ethyl - 5-[(3-ethyl-2(3)-benzothiazolylidene) - α - cyclopropylethylidene] - 2-thio-2,4(3,5)-oxazoledione*

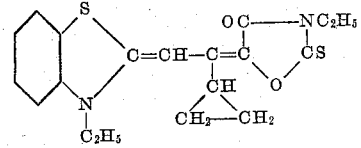

1.3 g. (1 mol.) of 2-cyclopropylthioformylmethylene-3-ethylbenzothiazoline and 1 g. (1 mol.) of methyl-p-toluenesulfonate were heated together at the temperature of a steam bath for 30 minutes. The mercapto intermediate thus formed was dissolved in 30 cc. of absolute ethyl alcohol and .7 g. of 3-ethyl-2-thio-2,4-(3,5)-oxazoledione. 1 g. (2 mol.) of triethylamine were added. The mixture was refluxed for 15 minutes. Dye separated on chilling. It was purified by recrystallization from methyl alcohol and obtained as scarlet needles with a blue reflex. Melting point 193°–195° C. dec.

*Example 20.—3-ethyl-5-[(3-ethyl-2(3)-benzothiazolylidene)-α-cyclohexylethylidene]- 2 - thio-2,4(3,5)-oxazoledione*

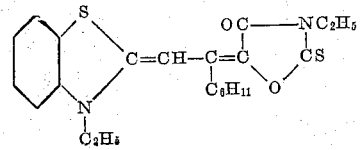

3 g. (1 mol.) of 2-cyclohexylthioformylmethylene-3-ethylbenzothiazoline and 2 g. (1 mol.) of methyl-p-toluene sulfonate were heated together on a steam bath for 30 minutes. The mercapto intermediate thus formed was dissolved in 30 cc. of absolute ethyl alcohol. To this solution was added 1.45 g. (1 mol.) 3-ethyl-2-thio-2,4(3,5)-oxazoledione and 1 g. (1 mol.) triethylamine and the mixture refluxed for 15 minutes. After chilling, the dye which had separated was collected on filter, washed with water, methyl alcohol and dried. It was purified by two recrystallizations from methyl alcohol. Melting point 158°–160° C.

*Example 21.—3-ethyl-5-[(3-ethyl-2(3)-benzothiazolylidene)-α-cyclobutylethylidene] - 2 - thio-2,4(3,5)-oxazoledione*

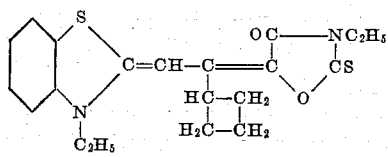

1.4 g. (1 mol.) of 2-cyclobutylthioformylmethylene-3-ethylbenzothiazoline and 1 g. (1 mol.) methyl-p-toluenesulfonate were heated together on a steam bath for 30 minutes. The mercapto intermediate thus formed was dissolved in 20 cc. of absolute ethyl alcohol, .75 g. (1 mol.) 3-ethyl-2-thio-2,4(3,5)-oxazoledione and 1 g. (2 mol.) triethylamine were added and the whole refluxed for 15 minutes. Dye separated on chilling and was collected on a filter, washed with methyl alcohol and dried. It was purified by recrystallization from methyl alcohol and obtained as reddish needles. Melting point 135°–137° C.

*Example 22.—3-ethyl-5-[(3-ethyl-2(3)-benzothiazolylidene)-α-cyclopropylethylidene] - rhodanine*

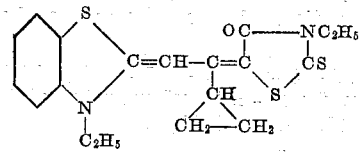

1.3 g. (1 mol.) of 2-cyclopropylthioformylmethylene-3-ethylbenzothiazoline and 1 g. (1 mol.) of methyl-p-toluenesulfonate were heated together at the temperature of a steam bath for 30 minutes. The mercapto intermediate thus formed was dissolved in 20 cc. of absolute ethyl alcohol and .8 g. (1 mol.) of 3-ethylrhodanine, 1 g. (2 mol.) triethylamine were added. This mixture was then heated under reflux for 15 minutes. Dye separated on chilling. It was purified by recrystallization from a mixture of pyridine and methyl alcohol and obtained as metallic needles. Melting point 197°–199° C. dec.

In a manner similar to that illustrated in the foregoing examples 19 to 22, α- and β-naphthothiazole quaternary salts containing in a reactive position a β-cycloalkyl-β-mercapto-alkylvinyl group can be condensed with heterocyclic compounds containing a ketomethylene group, such as 3-alkyl rhodanines and 3-alkyl-2-thio-2,4(3,5)-oxazolediones.

We have found that our new dyes spectrally sensitize photographic silver halide emulsions when incorporated therein. The dyes are especially useful for extending the spectral sensitivity of the customarily employed gelatino-silver-chloride, gelatino-silver-chlorobromide, gelatino-silver-bromide and gelatino-silver-bromiodide developing-out emulsions. To prepare emulsions sensitized with our new dyes, it is only necessary to disperse the dyes in the emulsions. The methods of incorporating dyes in emulsions are simple and well known to those skilled in the art. In practice, it is convenient to add the dyes to the emulsions in the form of a solution in an appropriate solvent. Methanol has proved satisfactory as a solvent for our new dyes. The dyes are advantageously incorporated in the finished, washed emulsions and should be uniformly distributed throughout the emulsions.

The concentration of dyes in the emulsion can vary widely, e. g., from 5 to about 100 mg. per liter of flowable emulsion. The concentration of the dyes will vary according to the type of the emulsion and according to the effects desired. The suitable and most economical concentration for any given emulsion will be apparent to those skilled in the art, upon making the ordinary tests and observations customarily used in the art of emulsion making. To prepare a gelatino-silverhalide emulsion sensitized with one or more of our new dyes, the following procedure is satisfactory:

A quantity of dye is dissolved in methyl alcohol and volume of this solution, which may be diluted with water containing from 5 to 100 mg. of dye, is slowly added to about 1000 cc. of gelatino-silver-halide emulsion, with stirring. Stirring is continued until the dye is thoroughly dispersed in the emulsion.

With most of our dyes, from 10 to 20 mg. of dye per liter of gelatino-silver-bromide or bromiode emulsion (containing about 40 g. of silver halide) suffices to produce the maximum sensitizing effect. With the finer-grain emulsion somewhat larger concentration of dye may be needed to produce the maximum sensitizing effect.

The above statements are only illustrative as it will be apparent that the dyes can be incorporated in photographic emulsions by any of the other methods known in the art, e. g., by bathing a plate or film upon which an emulsion is coated in a solution of the dye in an appropriate solvent. However, bathing methods are ordinarily not to be proved. Emulsions sensitized with one or more of our dyes can be coated upon suitable supports such as glass, cellulose derivative film, resin film or paper, in the usual manner.

The following table sets forth the sensitizing action of the dyes given in the several foregoing examples:

| Dye | Emulsion | Sensitizing Action |
| --- | --- | --- |
| Ex. 1 | gelatino - silver-bromiodide. | extends to 660 mu., max. at 580 mu. |
| Ex. 2 | do | extends to 660 mu., max. at 630 mu. |
| Ex. 3 | do | extends to 700 mu., max. at 610 mu. |
| Ex. 4 | do | extends to 670 mu., max. at 635 mu. |
| Ex. 5 | do | extends to 690 mu., max. at 640 mu. |
| Ex. 6 | do | extends to 700 mu., max. at 665 mu. |
| Ex. 7 | do | extends to 670 mu., max. at 605 mu. |
| Ex. 8 | do | max. at 580 mu. |
| Ex. 9 | do | Do. |
| Ex. 10 | do | from 510 to 590 mu. |
| Ex. 11 | do | from 520 to 660 mu., max. at 525 mu. |
| Ex. 12 | do | from 520 to 610 mu., max. at 590 mu. |
| Ex. 13 | do | from 556 to 610 mu., max. at 590 mu. |
| Ex. 19 | do | to 610 mu., max. 575 mu. |
| Ex. 20 | do | extends to 610 mu., max. 565 mu. |
| Ex. 21 | do | extends to 610 mu., max. 580 mu. |
| Ex. 22 | do | from 550 to 640 mu., max. 605 mu. |

What we claim as our invention and desire to be secured by Letters Patent of the United States is:

1. The carbocyanine dyes which are represented by the following general formula:

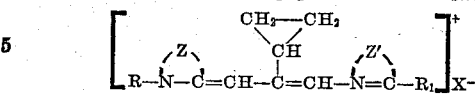

wherein R and R₁ represent alkyl groups of the formula $C_nH_{2n+1}$ wherein $n$ represents a positive integer of from 1 to 4, Z and Z' represent the nonmetallic atoms necessary to complete a heterocyclic nucleus selected from the group consisting of those of the benzothiazole series, those of the α-naphthothiazole series, those of the β-naphthothiazole series and those of the benzoselenazole series, and X represents an anion.

2. The carbocyanine dyes which are represented by the following general formula:

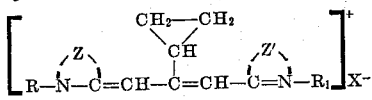

wherein R and R₁ each represents an alkyl group of the formula $C_nH_{2n+1}$ wherein $n$ represents a positive integer of from 1 to 4, Z and Z' each represents the non-metallic atoms necessary to complete a heterocyclic nucleus of the benzothiazole series, and X represents an anion.

3. A 9-cyclopropyl-3,3'-diethylthiacarbocyanine salt of the following general formula:

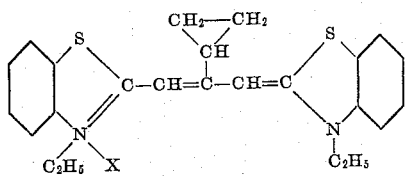

wherein X represents an anion.

4. 9-cyclopropyl-3,3'-diethylthiacarbocyanine iodide of the following formula:

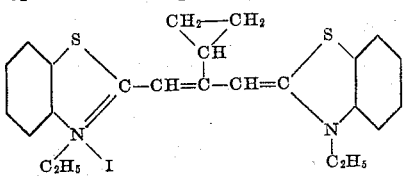

5. The carbocyanine dyes which are represented by the following general formula:

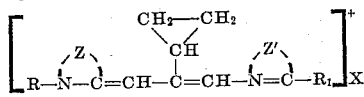

wherein R and R₁ each represents an alkyl group of the formula $C_nH_{2n+1}$ wherein $n$ represents a positive integer of from 1 to 4, Z and Z' each represents the non-metallic atoms necessary to complete a heterocyclic nucleus of the benzoselenazole series, and X represents an anion.

6. A 9-cyclopropyl-3,3'-diethylselenacarbocyanine salt of the following general formula:

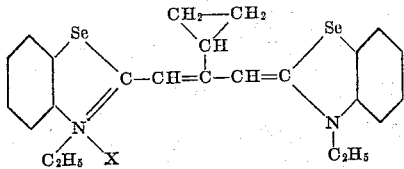

wherein X represents an anion.

7. 9-cyclopropyl-3,3''-diethylselenacarbocyanine iodide of the following formula:

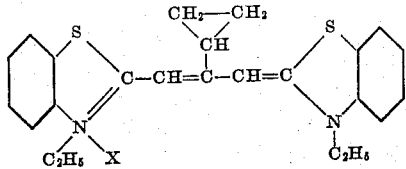

8. The carbocyanine dyes which are represented by the following general formula:

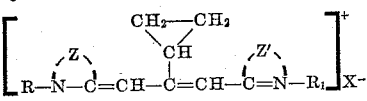

wherein R and R₁ represent alkyl groups of the formula $C_nH_{2n+1}$ wherein $n$ represents a positive integer of from 1 to 4, Z and Z' represent the non-metallic atoms necessary to complete a heterocyclic nucleus of the β-naphthothiazole series, and X represents an anion.

9. A 9-cyclopropyl-3,3'-diethyl-4,5,4',5'-dibenzothiacarbocyanine salt of the following general formula:

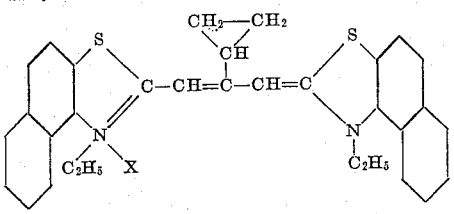

wherein X represents an anion.

10. 9-cyclopropyl-3,3'-diethyl-4,5,4',5'-dibenzothiacarbocyanine bromide of the following formula:

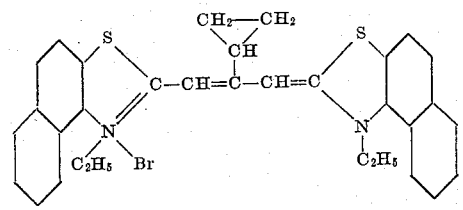

LESLIE G. S. BROOKER.
GRAFTON H. KEYES.

REFERENCES CITED

The following references are of record in the file of this patent:

UNITED STATES PATENTS

| Number | Name | Date |
|---|---|---|
| 2,106,383 | Schneider | Jan. 25, 1938 |
| 2,107,379 | Koslowsky | Feb. 8, 1938 |
| 2,112,139 | Brooker | Mar. 22, 1938 |
| 2,112,140 | Brooker | Mar. 22, 1938 |
| 2,315,498 | Brooker | Apr. 6, 1943 |

OTHER REFERENCES

Beilstein, vol. 9, 4th edition, p. 4.
Heilbrun, Dictionary of Organic Compounds, vol. I, p. 607.
Hack, Chemical Dictionary, third edition, p. 167.